United States Patent [19]

Shyu et al.

[11] Patent Number: 4,802,156
[45] Date of Patent: Jan. 31, 1989

[54] CUTTING MACHINE FOR PITS ON CD MASTER

[75] Inventors: Jia-Ming Shyu; Kuoan Huang; Jung-Lung Liu, all of Shin Chu Hsien, Taiwan

[73] Assignee: Industrial Technology Research Institute, Shin Chu Hsien, Taiwan

[21] Appl. No.: 79,036

[22] Filed: Jul. 29, 1987

[51] Int. Cl.[4] .............................................. G11B 3/00
[52] U.S. Cl. ..................................... 369/132; 310/311
[58] Field of Search .................. 364/475; 369/61, 132, 369/133; 310/311, 313 R

[56] References Cited

U.S. PATENT DOCUMENTS

| | | | |
|---|---|---|---|
| 3,842,194 | 10/1974 | Clemens | 369/132 |
| 4,035,590 | 7/1977 | Halter | 369/133 |
| 4,277,796 | 7/1981 | Ross | 369/61 |
| 4,295,216 | 10/1981 | Truesdell et al. | 369/132 |
| 4,349,902 | 9/1982 | Valachovic et al. | 369/132 |
| 4,434,481 | 2/1984 | Toda et al. | 369/132 |
| 4,453,242 | 6/1984 | Toda | 369/132 |
| 4,477,892 | 10/1984 | Tosima et al. | 369/132 |

Primary Examiner—Jerry Smith
Assistant Examiner—Allen MacDonald
Attorney, Agent, or Firm—Cushman, Darby & Cushman

[57] ABSTRACT

A cutting machine for cutting pits on a laser disc master comprising a disc signal source with a RAM and a series of shift registers; a machine unit having a servo-rotary shaft for mounting a master disc; a servo-horizontally moving shaft perpendicular to the rotary shaft; a deviation sensor mounted on the horizontally moving shaft perpendicular to the master disc; and a diamond cutting tool controlled by a signal-source-controlled piezoelectric driver. It also comprises a computer unit, which includes a disc signal control interface, and machine unit control interfaces. The rotation error of the machine unit can modulate the signal output speed of the signal source.

3 Claims, 2 Drawing Sheets

FIG·1

CUTTING MACHINE FOR PITS ON CD MASTER

BACKGROUND OF THE INVENTION

The compact disc can be used for storing a high density of digital data; the data are to be stored by means of a plurality of pits having different lengths and spaces along a spiral track around the center of the disc.

The compact disc usually includes a transparent substrate molded with a plurality of pits, a metallic coating on the substrate that can reflect the laser light, and a protective layer added as the surface. When reading out the data in a compact disc, a tiny laser in the player is focused on the spiral track from beneath while the compact disc is rotated at a constant linear velocity. The depth of the pits is equal to one half of the wave length of the laser (such as 0.1 mm). Since the pits and the plane portions (called lands) have a phase differential relation upon reflecting the laser beam, a different light contrast signal can be sensed corresponding to the length and space of the pits; that light contrast signal is then converted into an electronic signal, and decoded as on-off binary 1s and 0s (bits), which can be decoded, with a microprocessor, into the original data. The conventional laser recording method utilizes a photoresist layer deposited on a glass substrate. During the recording process, it is exposed by the laser beam which is modulated by the signal, then the pits are created during the development process of the photoresist layer, and then a silver film is coated thereon before the galvanic process needed for the manufacture of the pressing tools. The aforesaid manufacturing steps must be performed in a clean room environment, i.e., the manufacutring steps are cumbersome, and facilities therefore are expensive; as a result, the price of the laser disc is unable to be reduced.

The method of making the conventional record (LP) by using a diamond tool for the master has been used for making a CED video disc successfully. However, the quality of the LP is less than the laser video disc; for instance, the recorded data are analog signals, which when replayed have an inferior quality compared to digitally recorded signals. As a result, CED video disks were not manufactured in large quantity for commercial purpose.

In view of the aforesaid fact, an ideal and practical machine is necessary, which uses a diamond tool to cut pits directly on a master disc, so that the master disc make may be used directly, or used to duplicate compact discs in a mass production manner so as to lower the manufacturing cost, and to store the data thereon with digital signal to improve the quality of data. Since the recording pits on the compact disc are of high precision, the relationship between the cutting tool and the master disc and the moving speed thereof must be controlled accurately; therefore, a special control device is required to control the operation. In the conventional laser disc, the signal source for recording the master disc is from a PCM (pulse code modulation) tape machine, being played at a constant speed, which is unable to adapt to the characteristics of a machine using a tool to cut pits. Therefore, a special signal source means is required.

According to the aforesaid idea, the present invention has been developed to provide:
(1) a cutting machine which comprises a mechanical structure and a control device for executing an accurate operation between the cutting tool and the master disc;
(2) a signal source for the cutting machine, of which the output signal speed can fit the characteristics of the cutting machine.

SUMMARY OF THE INVENTION

This invention provides a cutting machine for pits on a compact disc master (cutting machine), comprising a computer unit, a disc signal source, and a machine unit. The disc signal source includes a RAM having sufficient storage capacity, and a series of shift registers able to be modulated. The machine unit includes a serve-rotary shaft for mounting a master disc, horizontally-moving servo-shaft perpendicular to the rotary shaft, a deviation sensor mounted on the horizontally moving shaft and perpendicular to the master disc, and a diamond tool piezoelectrically driven by the disc signal source. The computer unit includes a microprocessor, a disc signal control interface, and control interfaces of the machine unit. The output speed of the signal source is to be modulated in accordance with the rotating error of the machine unit.

DETAILED DESCRIPTION

The cutting machine according to the present invention comprises a computer unit, a disc signal source, and a machine unit. The disc signal source includes a large RAM and a series of adjustable shift registers. The machine unit includes a servo-rotary shaft for holding the master disc, a servo-controlled horizontally moving shaft, a deviation sensor mounted on the horizontally moving shaft and perpendicular to the master disc, and a diamond tool piezoelectrically driven by the signal from the signal source unit. The computer unit includes a microprocessor, a disc signal source control interface and control interfaces to the machine unit. The output speed of the signal source is to be regulated in accordence with the speed error of the machine unit. The structure and characteristics of this machine will further be described in detail with reference to the drawings in the follow paragraphs.

Figure 1:
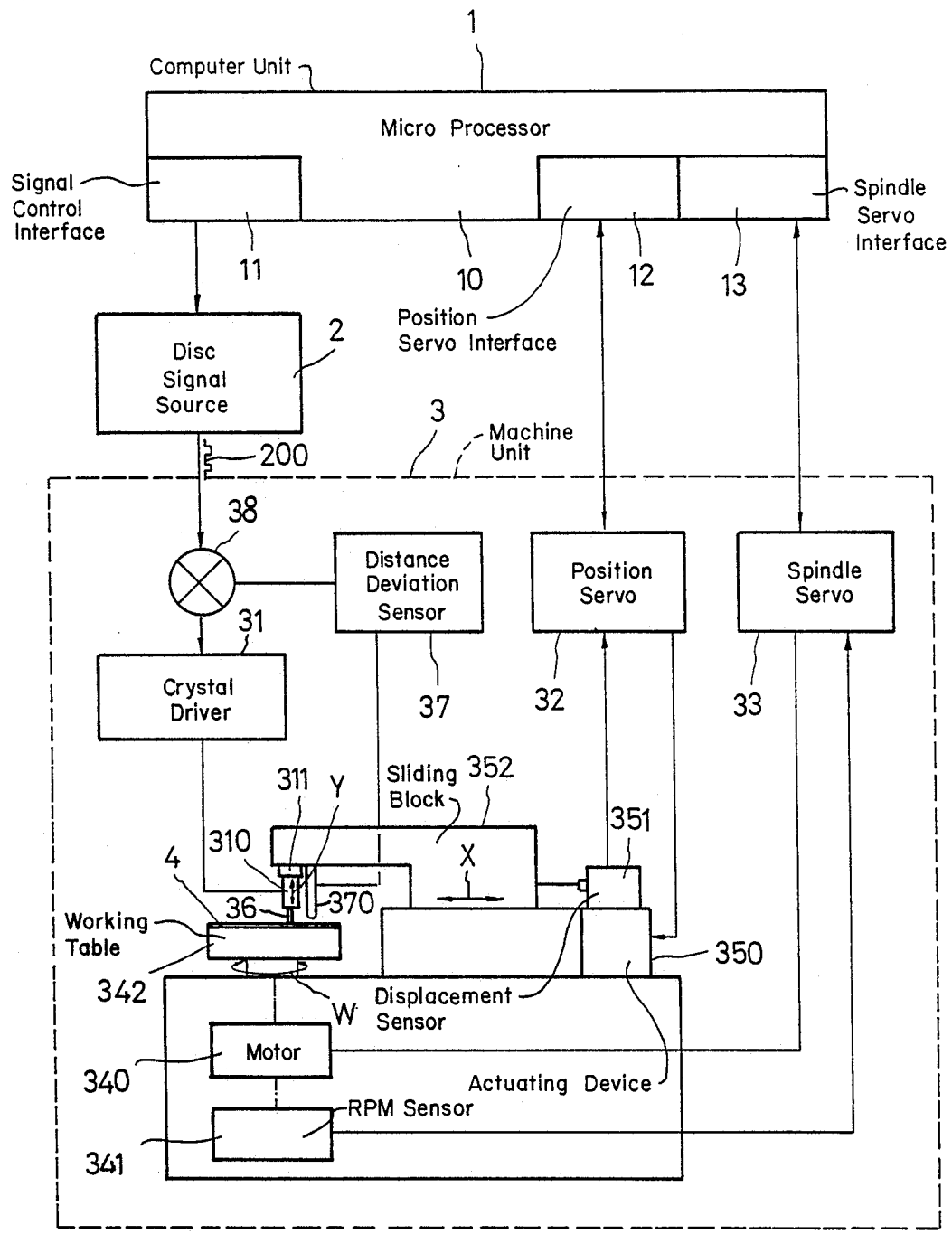
FIG. 1 illustrates the major stucture of the cutting machine according to the present invention.

FIG. 1 illustrates the structure of the present invention, which comprises three major components, i.e., a computer unit 1, a disc signal source 2, and a machine unit 3. The computer unit 1 includes a microprocessor 10 electrically connected to the disc signal source 2 via a signal control interface 11, and servo-control interfaces 12 and 13 connecting microprocessor 10 electrically with the horizontally moving shaft servo-control circuit (position servo) 32 of the machine unit 3 and the rotary shaft servo-control circuit (spindle servo) 33 respectively, so as to control the motion of the horizontally moving shaft X and the rotary shaft W. The rotary shaft W has a working table 342 for holding the metal master disc 4; the rotary shaft W is driven by motor 340, and is servo-controlled by means of a feedback signal from a rpm sensor 341. The horizontally moving shaft X has a sliding block 352 perpendicular to the rotary shaft W, i.e., being parallel with the surface of the master disc 4. The shaft X is actuated with the actuating device 350, and is servo-controlled by means of a displacement sensor 351, such as a laser measurement device. Under the sliding block 352 and perpendicular to the master disc 4, a piezoelectric crystal 310 is fixedly mounted via a damper 311. A diamond-like cutting tool 36 is fixedly mounted under the piezoelectric crystal 310, perpendicular to the master disc. The cutting tool 36 has a suitable blade so as to cut into the master disc 4 or to be lifted above the disc upon the piezoelectric crystal 310 changing its dimension and upon the rotary shaft rotating. A distance deviation sensor 37 has a distance-sensing head 370, which may be a capacitor-type sensor or a laser measurement device mounted on the sliding block 352 perpendicular to the master disc 4 and closely beside the cutting tool 36 so as to sense the position error along the axial direction Y during cutting operation; the error sensed will be converted into an electric signal to be coupled into a first differential amplifier 38 so as to modify and compensate the voltage level of the output signal 200 from the disc signal source 2, and then the piezoelectric crystal driver 31 will drive the piezoelectric crystal 310 and the cutting tool 36 to move up and down for controlling the pits cut in an accurate depth. Since the compact disc access is done at a linear constant velocity, the rpm of the rotary shaft W with the master disc is adjusted in accordance with the radius portion of the cutting tool 36, and also with the output speed of the signal 200 of the disk signal source 2; therefore, the speed control between the disc signal source 2 and the machine unit 3 has been particularly designed.

Figure 2:
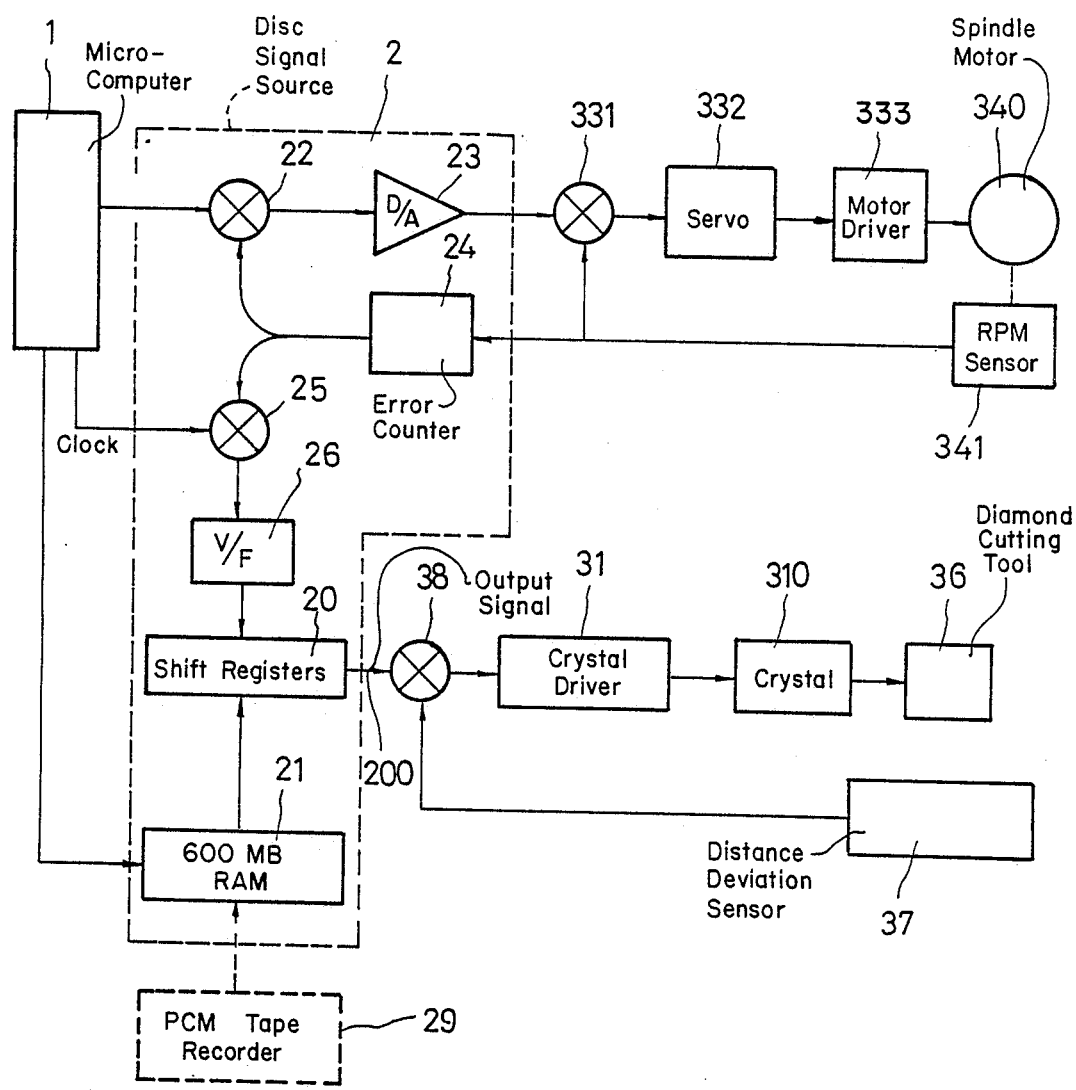
FIG. 2 illustrates the circuit block diagram of the cutting machine of the present invention.

In FIG. 2, the disc signal source 2 has a series of shift registers 20 to send out the disc signal data stored in a RAM 21. The RAM 21 has at least a sufficient capacity equal to a memory capacity of a disc (for example, 600 million bytes for a 4.7 in. disc) so as to record the signal data of a PCM tape machine or a DAT (digital audio tape) unit. By using the series of shift register 20, the speed of the output signal 200 can suitably be adjusted so as to adapt to the characteristics of the cutting tool 36; especially, the output speed of the output signal 200 can be adjusted immediately in accordance with the actual rotating speed of the master disc 4 so as to obtain accurate length and space between the disc pits. The microcomputer unit 1 can calculate the correct rpm of the motor 340 on the rotary shaft W with the compact disc in accordance with the position of the cutting tool 36 on the radius of the compact disc 4 (as shown in FIG. 1, that is to be sensed with the displacement sensor 351); the rotating speed instruction is then transmitted into a second differential amplifier 22; that instruction signal is then combined with the error value generated by the error counter 24 resulting from the actual feedback rotating speed signal out of the rpm sensor 341; the combined signal then passes through a digital-to-analog transducer 23, and is coupled to a third differential amplifier 331 so as to be combined with the feedback signal of the rpm sensor 341, whereby a further precise vector circuit is formed; finally, the signal will control the motor 340 to rotate at an accurate speed through the rpm servo-controller 332 and the motor driver 333. Moreover, the error value generated from the error counter 24 will be transmitted into a fourth differential amplifier 25 so as to combine with the standard clock pulse generated by the computer unit 1; then, the signal will pass through the voltage-to-frequency transducer 26 to generate a compensating pulse for controlling the series of shift registers 20 so as to adapt to the minor rpm error of motor 340 and to send out an accurate disc signal 200; then, an accurate pit-cutting operation on the disc 4 can be conducted by using together with the aforementioned first differential amplifier 38, the piezoelectric crystal driver 31, the piezoelectric crystal 310, the cutting tool 36, and the distance deviation sensor 37.

We claim:

1. A machine for cutting pits on a compact disc master comprising:
   a disc signal source for generating an adjustable signal corresponding with a length and space of the pits to be cut;
   a machine unit including:
      a rotary shaft having an axis,
      a working table for mounting a master disc perpendicular to said axis,
      a motor,
      a rpm sensor,
      a first servo-control circuit, said first servo-control circuit operating with said rpm sensor and said motor for servo-driving said rotary shaft,
      a horizontally moving shaft having a sliding block supported perpendicular to said axis to move horizontally,
      a linear actuating means controlled by a second servo-control circuit with a displacement sensor for servo-driving said horizontally moving shaft,
      a piezoelectric crystal mounted on said sliding block, perpendicular to said master disc, able to have corresponding extension and contraction motions in an axial direction,
      a cutting tool fixedly mounted on a moving end of said piezoelectric crystal, said cutting tool having a suitable blade so as to cut or lift above said master disc in accordance with said motion of said piezoelectric crystal,
      distance deviation sensor means for sensing a position error of said piezoelectric crystal along said axial direction, said distance deviation sensor means having a sensing head perpendicular to said master disc and being fixedly mounted on said sliding block close to said cutting tool to sense a distance deviation of said cutting tool to said master disc, converting said deviation into an electric signal, and
      distance setting means, responsive to said distance deviation sensor means and said adjustable signal from said disc signal source, for extending or contracting said piezoelectric crystal along said axial direction; and
   a computer unit including:
      signal control interface means electrically connected to said disc signal source for adjusting said adjustable signal from said disc signal source,
      first servo-control interface means for controlling said first servo-control circuit, and
      second servo-control interface means for controlling said second servo-control circuit.

2. A cutting machine as recited in claim 1, wherein said disc signal source further includes:
   a RAM for providing signal data for a cutting operation of a CD;
   a series of shift registers connected to said RAM for data output to said machine unit; and
   speed compensating means, responsive to a standard pulse from said computer unit and a signal from said rotary shaft of said machine unit, for controlling said data output to said machine output from said shift registers.

3. A cutting machine as recited in claim 2, wherein said speed compensating means includes:

counting means, responsive to said signal from said rotary shaft of said machine unit, for counting an error of an actual rpm of said rotary shaft with respect to a target rpm and converting it into an rpm error signal;

a fourth differential amplifier combining said standard pulse from said computer unit with said rpm error signal to output a combined signal; and a voltage-to-frequency transducer converting said combined signal into a modulated pulse and then transmitting said modulated pulse into said series of shift registers.

* * * * *